(12) United States Patent
Nishikawa et al.

(10) Patent No.: US 7,488,524 B2
(45) Date of Patent: Feb. 10, 2009

(54) HIGH-DURABILITY PHOTOCATALYST FILM AND STRUCTURE HAVING PHOTOCATALYTIC FUNCTIONS ON SURFACE

(75) Inventors: Ryouzo Nishikawa, Gifu (JP); Naoki Tanaka, Gifu (JP); Norihiro Nakayama, Gifu (JP)

(73) Assignee: UBE Nitto Kasei Co., Ltd., Tokyo (JP)

( * ) Notice: Subject to any disclaimer, the term of this patent is extended or adjusted under 35 U.S.C. 154(b) by 0 days.

(21) Appl. No.: 10/522,915

(22) PCT Filed: Jul. 30, 2003

(86) PCT No.: PCT/JP03/09667

§ 371 (c)(1),
(2), (4) Date: May 18, 2005

(87) PCT Pub. No.: WO2004/011244

PCT Pub. Date: Feb. 5, 2004

(65) Prior Publication Data

US 2005/0249943 A1   Nov. 10, 2005

(30) Foreign Application Priority Data

Jul. 31, 2002   (JP)   ............................. 2002-223122

(51) Int. Cl.
*B32B 9/00* (2006.01)
*B32B 33/00* (2006.01)

(52) U.S. Cl. .................... 428/41.7; 428/40.1; 428/41.8; 428/42.2; 428/41.5; 428/913

(58) Field of Classification Search ................ 428/40.1, 428/41.7, 42.2, 41.8
See application file for complete search history.

(56) References Cited

U.S. PATENT DOCUMENTS 6,737,145 B1   5/2004   Watanabe et al.

FOREIGN PATENT DOCUMENTS

| JP | 96/29375 | 9/1996 |
|----|----------|--------|
| JP | 08-283425 A | 10/1996 |
| JP | 09-087526 A | 3/1997 |
| JP | 2000-71377 A | 3/2000 |
| JP | 2000-334876 | * 12/2000 |
| JP | 2000-336281 | 12/2000 |
| JP | 2001-47584 A | 2/2001 |
| WO | WO 91/18933 A2 | 12/1991 |
| WO | WO 00/23523 A1 | 4/2000 |

* cited by examiner

*Primary Examiner*—Ling Xu
(74) *Attorney, Agent, or Firm*—Nixon & Vanderhye P.C.

(57) ABSTRACT

A high-durability photocatalyst film that is a laminated film comprising a substrate film and a photocatalytically active material layer formed thereon via a protective layer, wherein the substrate film is a film having specific performances in a weather resistance test with a sunshine weatherometer, the protective layer is an organic-inorganic composite graded film and the above laminated film exhibits specific performances in an accelerated weather resistance test with a sunshine weatherometer, and a structure having photocatalytic functions on a surface formed of the above photocatalyst film.

8 Claims, 3 Drawing Sheets

US 7,488,524 B2

HIGH-DURABILITY PHOTOCATALYST FILM AND STRUCTURE HAVING PHOTOCATALYTIC FUNCTIONS ON SURFACE

This application is the US national phase of international application PCT/JP2003/009667 filed 30 Jul. 2003 which designated the U.S. and claims benefit of JP 2002-223122, dated 31 Jul. 2002, the entire contents of each of which are hereby incorporated by reference.

TECHNICAL FIELD

The present invention relates to a high-durability photocatalyst film and a structure having photocatalytic functions on its surface. More specifically, the present invention relates to a photocatalyst film that has a photocatalytically active material layer on a substrate film surface via a protective layer, which is excellent in weather resistance, transparency and inter-layer adhesion, which is useful as a functional film for exhibiting photocatalytic functions, and which particularly has a long life time, and a structure having photocatalytic functions on its surface formed of the above photocatalyst film.

TECHNICAL BACKGROUND

When a photocatalytically active material (to be sometimes simply referred to as "photocatalyst" hereinafter) is irradiated with energy of its band gap or higher, it is excited to generate electrons in a conduction band, and holes are generated in a valence band. And, it is known that the generated electrons reduce surface oxygen to generate super oxide anions ($.O^{2-}$), that the holes oxidize surface hydroxyl groups to generate hydroxy radicals (.OH), and that these reactive activated oxygen species exhibit a strong oxidative decomposition function and highly efficiently decompose organic substances adhering to the photocatalyst surface.

Studies are being made of the application of the above functions of the photocatalyst, for example, to deodorization, antifouling, antibacterial protection and sterilization and further to decomposition and removal of those various substances in waste water or waste gas, which are problems to cause environmental pollution.

As another function of the photocatalyst, further, it is also known that a photocatalyst surface exhibits super-hydrophilic nature in which the contact angle thereof to water is 10° or less when the photocatalyst is optically excited, as is disclosed, for example, in International Patent Publication No. 96/29375. Studies are being made of the application of the above super-hydrophilic function of the photocatalyst to the prevention of the fouling caused, for example, on sound insulation walls along an expressway, illumination lamps in a tunnel, street lights, etc., by soot, etc., contained in emission gases from automobiles or the use of the photocatalyst for a film for a body coating or side-view mirror of an automobile or for a defogging or self-cleaning window mirror.

As the above photocatalyst, various compounds having semiconductor properties are known, and among these are metal oxides such as titanium dioxide, iron oxide, tungsten oxide and zinc oxide and metal sulfides such as cadmium sulfide and zinc sulfide. Of these, titanium oxide, particularly anatase type titanium dioxide, is useful as a practical photocatalyst. This titanium dioxide exhibits excellent photocatalytic activities by absorption of light having a specific wavelength in the ultraviolet region included in ordinary light such as sunlight.

When a photocatalyst layer is formed on an organic substrate such as a plastic substrate, there is caused a problem that the organic substrate inevitably deteriorates in a short period of time when the photocatalyst is directly coated thereon. In a photocatalyst film having a photocatalyst layer, for example, on a plastic film, therefore, an intermediate layer is generally formed for preventing the deterioration caused on the substrate film by photocatalytic activity and for improving adhesion to the substrate film. As the above intermediate film, there is generally employed an approximately several μm thick film made of a silicone resin, an acryl-modified silicone resin, or the like.

However, the above photocatalyst film is caused to have problems that it deteriorates in approximately 1 to 3 years and that the transparency thereof decreases due to an interference of the films or that the antifouling property thereof decreases. The above deterioration is presumably caused as follows. Since the above intermediate layer has an organic substituent, this organic component is decomposed by the photocatalytic activity, and as a result, the intermediate layer is caused to undergo cracking, or "floating" or partial separation occurs in an interface between the photocatalyst layer and the intermediate layer or between the intermediate layer and the substrate film to cause the interference. In the above photocatalyst film, further, there is another problem that since the intermediate layer is as thick as several μm, it is liable to cause partial interfacial separation or chipping due to the bending or flexing of the film per se, so that the interference is liable to occur.

On the other hand, the present inventors have found an organic-inorganic composite graded material having a composition that continuously changes in the thickness direction, which material is useful as a novel functional material in the various fields, for example, of a coating film, an adhesive for bonding an organic material and an inorganic or metallic material, an intermediate film that is formed between an organic substrate and a photocatalyst film and that prevents the deterioration of the organic substrate and an intermediate film that improves the adhesion of an organic substrate and an inorganic or metallic material (Japanese Patent Application No. 11-264592).

The above organic-inorganic composite graded material is an organic-inorganic composite material containing a chemical-bonding product of an organic polymer compound and a metallic compound and has a components-gradient structure in which the content of the above metallic compound continuously changes in the material thickness direction, and it is a novel material useful in the above various fields.

The present inventors have found that the deterioration of the organic substrate by the photocatalyst can be prevented by interposing, as a protective layer, a film of the above organic-inorganic composite graded material between the organic substrate and the photocatalyst layer when the photocatalyst layer is formed on the organic substrate, and a patent application directed to this art has been filed.

Since, however, the above composite graded film is formed of a transparent material, the effect of blocking sunlight including ultraviolet light cannot be expected, and the weather resistance of the substrate itself accounts for the lifetime of a product thereof. When the above composite graded film is formed, further, it is essential to apply a coating liquid containing an organic solvent, and the resistance of the substrate to the solvent is also an essential factor for the product lifetime.

DISCLOSURE OF THE INVENTION

Under the circumstances, it is an object of the present invention to provide a photocatalyst film that is excellent in weather resistance, transparency and inter-layer adhesion, that is useful as a functional film that exhibits photocatalytic functions in various fields and that particularly has a long lifetime, and a structure having photocatalytic functions on its surface formed of the above photocatalyst film.

The present inventors have made diligent studies for developing a photocatalyst film having the above excellent properties and having a long lifetime. As a result, it has been found that the above object can be achieved by a photocatalyst film that is a laminated film which has a laminated structure formed of a substrate film, a protective layer formed on the substrate film and a photocatalytically active material layer formed on the protective layer, which uses, as the above substrate film, a film having specific physical properties after a 3,000 hours' accelerated weather resistance test with a carbon arc type sunshine weatherometer (irradiance level 225 W/m$^2$) or after a 1,000 hours' accelerated weather resistance test with a carbon arc type sunshine weatherometer (irradiance level 255 W/m$^2$) and having solvent resistance and which uses, as the protective layer, an organic-inorganic composite graded film, the photocatalyst film having specific physical properties after a 3,000 hours' accelerated weather resistance rest with a carbon arc type sunshine weatherometer (irradiance level 225 W/m$^2$) or after a 1,000 hours' accelerated weather resistance test with a carbon arc type sunshine weatherometer (irradiance level 255 W/m$^2$). The present invention has been completed on the basis of the above finding.

That is, the present invention provides;

(1) a high-durability photocatalyst film which is a laminated film having (A) a substrate film, (B) a protective layer formed on one surface thereof and (C) a photocatalytically active material layer formed thereon and having photocatalytic functions, which uses, as said substrate film (A), a film (1) having a total light transmittance of 85% or more, a haze of 5% or less and a yellow index (YI) of 10 or less after a 3,000 hours' accelerated weather resistance test of the film having a thickness of 50 μm with a carbon arc type sunshine weatherometer (irradiance level 225 W/m$^2$) and (2) having a haze change of 1% or less after the film surface is wetted with methyl isobutyl ketone, is left for 20 seconds and then has a liquid driven away by spin coating (1,500 rpm, 20 seconds), and which uses, as the above protective layer (B), an organic-inorganic composite graded film having an organic polymer component on the substrate film side and a metal oxide compound component on the opposite side and having contents of the two components which contents continuously change in the thickness direction, said laminated film having a total light transmittance of 85% or more, a haze of 5% or less, a yellow index (YI) of 10 or less and a water contact angle of 10° or less after a 3,000 hours' accelerated weather resistance test with a carbon arc type sunshine weatherometer (irradiance level 225 W/m$^2$), (2) a high-durability photocatalyst film which is a laminated film having (A) a substrate film, (B) a protective layer formed on one surface thereof and (C) a photocatalytically active material layer formed thereon and having photocatalytic functions, which uses, as said substrate film (A), a film (1) having a total light transmittance of 85% or more, a haze of 5% or less and a yellow index (YI) of 10 or less after a 1,000 hours' accelerated weather resistance test of the film having a thickness of 50 μm with a carbon arc type sunshine weatherometer (irradiance level 255 W/m$^2$) and (2) having a haze change of 1% or less after the film surface is wetted with methyl isobutyl ketone, is left for 20 seconds and then has a liquid driven away by spin coating (1,500 rpm, 20 seconds), and which uses, as the above protective layer (B), an organic-inorganic composite graded film having an organic polymer component on the substrate film side and a metal oxide compound component on the opposite side and having contents of the two components which contents continuously change in the thickness direction, said laminated film having a total light transmittance of 85% or more, a haze of 5% or less, a yellow index (YI) of 10 or less and a water contact angle of 10° or less after a 1,000 hours' accelerated weather resistance test with a carbon arc type sunshine weatherometer (irradiance level 255 W/m$^2$), (3) a high-durability photocatalyst film as recited in the above (1) or (2), which has an adhesive layer (D) on that surface of the substrate film which is opposed to the photocatalytically active material layer side, (4) a high-durability photocatalyst film as recited in the above (3), which has peel film on the surface of the adhesive layer (D), (5) a high-durability photocatalyst film as recited in any one of the above (1) to (4), which has a protective film on the surface of the photocatalytically active material layer (C), (6) a high-durability photocatalyst film as recited in any one of the above (1) to (5), wherein the organic-inorganic composite graded film as the protective layer (C) is a product formed by applying a coating agent prepared by together hydrolyzing (a) an organic polymer compound whose molecule contains a metal-containing group capable of bonding to a metal oxide by hydrolysis and (b) a metal-containing compound capable of forming a metal oxide by hydrolysis, such that the formed product has an amount, as a component (a), of 0.5 to 5.0 g/100 m$^2$, (7) a high-durability photocatalyst film as recited in the above (6), wherein the metal-containing compound capable of forming a metal oxide by hydrolysis, as component (b), is tetraalkoxytitanium whose alkoxyl group has 1 to 5 carbon atoms, (8) a high-durability photocatalyst film as recited in any one of the above (1) to (7), wherein the substrate film (A) is an acrylic resin film or a polyethylene terephthalate film which is surface-coated with a crosslinking acrylic resin containing an anti-weathering agent, and (9) a structure produced by forming the high-durability photocatalyst film recited in any one of the above (1) to (8) and having a photocatalytic function on a surface.

PREFERRED EMBODIMENTS OF THE INVENTION

Figure 1:
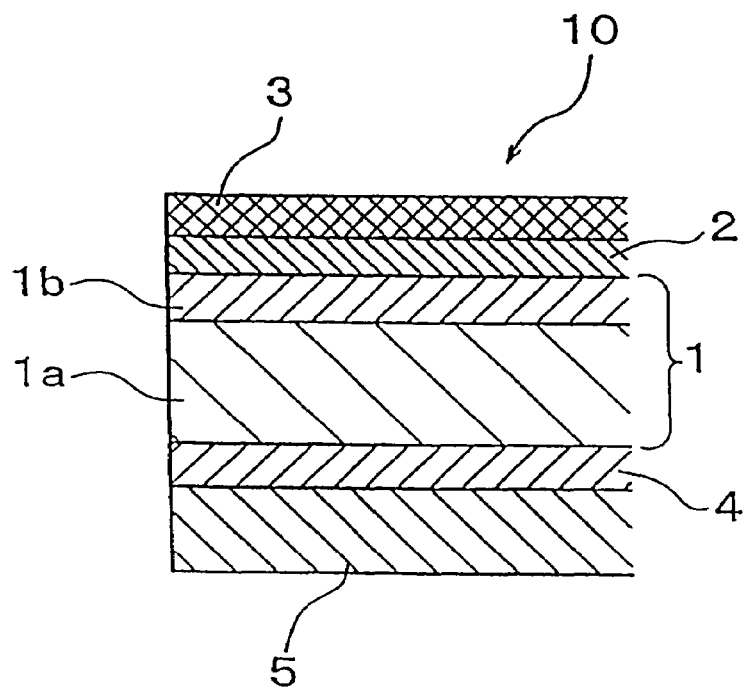
FIG. 1 is a cross-sectional view of one embodiment of the constitution of the high-durability photocatalyst film of the present invention.

The high-durability photocatalyst film of the present invention has a structure in which a protective layer (B) is formed on one surface of a substrate film (A), a photocatalytically active material layer (C) is formed on the protective layer, and optionally, an adhesive layer (D) is formed on the other surface of the above substrate film.

In the high-durability photocatalyst film (to be sometimes referred to as "photocatalyst film" hereinafter) of the present invention, the substrate film for use as the layer (A) is required to have a total light transmittance of 85% or more, a haze of 5% or less and weather resistance represented by a yellow index (YI) of 10 or less, after the substrate film having a thickness of 50 μm is subjected to a 3,000 hours' accelerated weather resistance test with a carbon arc type sunshine weatherometer (irradiance level 225 W/m$^2$) or a 1,000 hours' accelerated weather resistance test with a carbon arc type sunshine weatherometer (irradiance level 255 W/m$^2$).

The above accelerated weather resistance test is carried out according to a carbon arc type sunshine weatherometer testing method [Tester: Sunshine weatherometer "S300", supplied by Suga Test Instruments Co., Ltd.] under conditions where cycle: irradiation for 102 minutes and irradiation+rain for 18 minutes totaling 2 hours for 1 cycle and a black panel temperature: 63±3° C. After the accelerated weather resistance test, YI is determined according to JIS K7103, and the total light transmittance and the haze are determined according to JIS K7361.

The time period for testing under conditions of an irradiance level of 225 W/m$^2$ and a relative humidity of 55±5% is 3,000 hours, and the counterpart under the conditions of an irradiance level of 255 W/m$^2$ and a relative humidity of 50±2% is 1,000 hours.

Further, the above substrate film is required to have solvent resistance represented by a haze change of 1% or less after the film surface is wetted with methyl isobutyl ketone, is left for 20 seconds and has a liquid driven away by spin coating (1,500 rpm, 20 seconds). The above haze change refers to a obtained by measuring a 50 μm thick film according to JIS K7361.

Examples of the resin for constituting the above substrate film include acrylic resins such as polymethyl methacrylate, styrene resins such as polystyrene and ABS resin, olefin resins such as polyethylene and polypropylene, polyester resins such as polyethylene terephthalate and polyethylene naphthalate, polyamide resins such as 6-nylon and 6,6-nylon, a polyvinyl chloride resin, a polycarbonate resin, a polyphenylene sulfide resin, a polyphenylene ether resin, a polyimde resin, cellulose resins such as cellulose acetate, and fluorine resins such as polyvinylidene fluoride, an ethylene fluoride-propylene copolymer and an ethylene fluoride-ethylene copolymer.

These resins may be used singly or may be used in combination of at least two members thereof.

The substrate film in the present invention is not specially limited so long as it is a plastic film having weather resistance and solvent resistance that satisfy the above conditions. A substrate film having solvent resistance is selected, for example, from (1) a film formed of a weather-resistant resin, (2) a film into which an anti-weathering agent is incorporated or (3) a film having an ultraviolet-blocking layer on the surface of the organic-inorganic composite graded film alone or on each surface thereof, as required.

Further, an anti-weathering agent may be incorporated even into a film formed of a weather-resistant resin, or an ultraviolet ray intercepting layer may be formed on the surface of a film formed of a weather-resistant resin. Further, an ultraviolet-blocking layer may be formed on the surface of a film into which an anti-weathering agent is incorporated, as required.

Of the above plastic films, examples of the (1) film formed of a weather-resistant resin preferably include a film formed of an acrylic resin such as polymethyl methacrylate, a film formed of a polyester resin such as polyethylene terephthalate or polyethylene naphthalate, a film formed of a polycarbonate resin, a film formed of a cellulose resin such as cellulose acetate and a film formed of a fluorine resin such as polyvinylidene fluoride.

In the (2) film into which an anti-weathering agent is incorporated, an ultraviolet absorbent and/or a light stabilizer may be used as the anti-weathering agent. The above ultraviolet absorbent refers to an agent having the functions of absorbing ultraviolet ray having high energy and converting light to low energy to suppress the generation of radicals so that the deterioration of the plastic film is prevented. The light stabilizer refers to an agent having the function of bonding to radicals generated by ultraviolet ray to inhibit a chain reaction so that the deterioration of the plastic film is prevented.

Generally, the above ultraviolet absorbent can be largely classified into salicylate, benzophenone, benzotriazole, substituted acrylonitrile and other ultraviolet absorbents.

Examples of the salicylate ultraviolet absorbent include phenyl salicylate, p-octyl phenyl salicylate and p-tert-butyl phenyl salicylate. Examples of the benzophenone ultraviolet absorbent include 2,2'-dihydroxy-4-methoxybenzophenone, 2,2'-dihydroxy-4,4'-dimethoxybenzophenone, 2,2',4,4'-tetrahydroxybenzophenone, 2-hydroxy-4-methoxybenzophenone, 2,4-dihydroxybenzophenone and 2-hydroxy-4-octoxybenzophenone. Further, examples of the benzotriazole ultraviolet absorbent include 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-3'-tert-amyl-5'-isobutylphenyl)-5-chlorobenzotriazole, 2-(2'-hydroxy-3'-isobutyl-5'-methylphenyl)-5-chlorobenzotriazole, 2-(2'-hydroxy-3'-isobutyl-5'-propylphenyl)-5-chlorobenzotriazole, 2-(2'-hydroxy-3',5'-di-tert-butylphenyl)benzotriazole, 2-(2'-hydroxy-5'-methylphenyl)benzotriazole and 2-[2'-hydroxy-5'-(1,1,3,3-tetramethyl)phenyl]benzotriazole. Examples of the substituted acrylonitrile ultraviolet absorbent include ethyl 2-cyano-3,3-diphenyl acrylate and 2-ethylhexyl 2-cyano-3,3-diphenyl acrylate. The other ultraviolet absorbent includes, for example, resorcinol monobenzoate, 2,4-di-tert-butylphenyl-3,5-di-tert-butyl-4-hdyroxybenzoate and N-(2-ethylphenyl)-N'-(2-ethoxy-5-tert-butylphenyl)oxalic acid diamide. These ultraviolet absorbents may be used singly or may be used in combination of at least two members thereof.

The light stabilizer is preferably a hindered amine light stabilizer, and examples thereof include bis(2,2,6,6-tetramethyl-4-piperidyl)sebacate, a dimethyl succinate-1-(2-hydroethyl-4-hdyroxy-2,2,6,6-tetramethylpiperidine polycondensate, poly[6-(1,1,3,3-tetramethylbutyl)imino-1,3,5-triazin-2,4-diyl][2,2,6,6-tetramethyl-4-piperidyl]imino) hexamethylene[2,2,6,6-tetramethyl-4-piperidyl]imide), tetrakis(2,2,6,6-tetramethyl-4-piperidyl)-1,2,3,4-butanetetracarboxylate, 2,2,6,6-tetramethyl-4-piperidyl benzoate, bis (1,2,6,6-pentamethyl-4-piperidyl)-2-(3,5-di-tert-butyl-4-hydroxybenzyl)-2-n-butyl malonate, bis(N-methyl-2,2,6,6-tetramethyl-4-piperidyl)sebacate, 1,1'-(1,2-ethandiyl)bis(3, 3,5,5-tetramethylpiperazine), (mixed 2,2,6,6-tetramethyl-4-piperidyl/tridecyl)-1,2,3,4-butane tetracarboxylate, (mixed 1,2,2,6,6-pentamethyl-4-piperidyl/tridecyl)-1,2,3,4-butane tetracarboxylate, mixed [2,2,6,6-tetramethyl-4-piperidyl/β,β,β',β'-tetramethyl-3,9-[2,4,8,10-tetraoxaspiro(5,5)undecane]diethyl]-1,2,3,4-butane tetracarboxylate, mixed [1,2,2,6,6-pentamethyl-4-piperidyl/β,β,β',β'-tetramethyl-3,9-[2,4,8,10-tetraoxaspiro(5,5)undecane]diethyl]-1,2,3,4-butane tetracarboxylate, an N,N'-bis(3-aminopropyl)ethylenediamine-2,4-bis[N-butyl-N-(1,2,2,6,6-pentamethyl-4-piperidyl)amino]-6-chloro-1,3,5-triazine condensate, poly[6-N-morpholyl-1,3,5-triazin-2,4-diyl][(2,2,6,6-tetramethyl-4-piperidyl)imino]hexamethylene[(2,2,6,6-tetramethyl-4-piperidyl)imide], a condensate of N,N'-bis(2,2,6,6-tetramethyl-4-piperidyl)hexamethylene diamine and 1,2-dibromoethane, and [N-(2,2,6,6-tetramethyl-4-piperidyl)-2-methyl-2-(2,2,6,6-tetramethyl-4-piperidyl)imino] propionamide. These stabilizers may be used singly or may be used in combination of at least two members thereof, and it may be used in combination with the above ultraviolet absorbent.

Further, in the (3) plastic film having an ultraviolet-blocking layer on the surface, the ultraviolet-blocking layer refers to a layer formed of a proper binder and an ultraviolet-blocking material contained therein, and it may have a single-layered structure or may have a stacked structure of two or more layers. The above ultraviolet-blocking material is at least one member selected from an ultraviolet absorbent and an ultraviolet-scattering agent. When the layer containing an ultraviolet-blocking material is formed, ultraviolet ray is effectively blocked, and the deterioration of the substrate film by ultraviolet ray can be suppressed.

The above ultraviolet absorbent includes those described as examples in the explanation of the ultraviolet absorbent in the above anti-weathering agent. These ultraviolet absorbents may be used singly or may be used in combination of at least two members thereof. Further, the ultraviolet absorbent may be used in combination of the above light stabilizer as required.

The ultraviolet-scattering agent refers to a material that scatters ultraviolet ray to produce an ultraviolet-blocking effect, and it is mainly selected from inorganic materials such as metal oxide powders. Examples of the above ultraviolet-scattering agent include a powder obtained by finely milling titanium dioxide, zinc oxide, cerium oxide, or the like, a hybrid inorganic powder obtained by compounding titanium dioxide fine particles with iron oxide and a hybrid inorganic powder obtained by surface-coating cerium oxide fine particles with non-crystalline silica. The ultraviolet-scattering effect is greatly influenced by a particle diameter. In the present invention, therefore, the average particle diameter of the above ultraviolet-scattering agent is preferably 5 μm or less, particularly preferably in the range of 10 nm to 2 μm. When the ultraviolet-scattering agent has photocatalytic activity, preferably, it is used after the surface of each particle thereof is thinly coated with water glass or the like to remove the photocatalytic activity.

The ultraviolet-blocking layer in the present invention may be a layer having a single-layered structure containing at least one member selected from the above ultraviolet absorbents and ultraviolet-scattering agents, or it may be a layer having a stacked structure of at least two layers including a layer containing the ultraviolet absorbent and a layer containing the ultraviolet-scattering agent.

The content of the above ultraviolet-blocking material in the ultraviolet-blocking layer is not specially limited and can be determined as required depending upon kinds of the ultraviolet-blocking material or kinds of the substrate film, while it is generally 0.01 to 10% by weight, preferably in the range of 0.05 to 5% by weight. When the ultraviolet-blocking material is an ultraviolet-scattering agent, the content thereof is preferably in the range of 0.1 to 10% by weight, particularly preferably in the range of 1 to 5% by weight. When the ultraviolet-blocking material is an ultraviolet absorbent, the content thereof is preferably in the range of 0.01 to 10% by weight, particularly preferably in the range of 0.05 to 5% by weight.

The binder for forming the above ultraviolet-blocking layer is preferably an organic binder since the organic-inorganic composite graded film is formed on the ultraviolet-blocking layer. The organic binder is not specially limited, and examples thereof include known binders such as an acrylic resin, a polyester resin, a polyurethane resin and a butyral resin, and further, a cured product of an ultraviolet-curable resin is also included. The ultraviolet absorbent may be kneaded into the organic binder. More preferably, the ultraviolet absorbent is chemically bonded to the main chain or side chain of the above organic binder, since the layer has no risk of the ultraviolet absorbent bleeding out.

The ultraviolet-blocking layer in the present invention can be formed by preparing a coating liquid containing the above binder and the ultraviolet-blocking material, applying the coating liquid onto the plastic film as a substrate by a known method such as a bar coating method, a knife coating method, a roll coating method, a blade coating method, a die coating method or a gravure coating method and curing the applied coating liquid by heating it or irradiating it with ultraviolet light. The thickness of the ultraviolet-blocking layer is generally 0.1 to 20 μm, preferably in the range of 0.5 to 10 μm.

As the substrate film in the present invention, an acrylic resin film and a polyethylene terephthalate film whose surface is coated with a crosslinking acrylic resin containing an anti-weathering agent are preferred in view of weather resistance, solvent resistance and formability of the composite graded film that is a protective layer.

In the present invention, the substrate film generally has a thickness in the range of 500 to 20 μm, preferably in the range of 200 to 25 μm.

When the above substrate film is a film formed of a weather-resistant resin or a film into which an anti-weathering agent is incorporated as described above, one surface or both surfaces thereof may be surface-treated by an oxidation method or a roughening method for improving adhesion thereof to the organic-inorganic composite graded film to be formed on the front surface thereof or to the adhesive layer to be formed on the reverse surface thereof as required. The above oxidation method includes, for example, corona discharge treatment, chromic acid treatment (wet method), flame treatment, hot air treatment and ozone-ultraviolet irradiation. Further, the roughening method includes, for example, a sand blasting method and a solvent treating method. While the surface treatment method is selected from these as required depending upon kinds of the substrate film, a corona discharge treatment method is preferably used in view of an effect and operationality.

Further, when the substrate film has an ultraviolet-blocking layer on the surface thereof, one surface or both surfaces thereof may be surface-treated by an oxidation method or a roughening method similarly to the above, for improving adhesion thereof to the ultraviolet-blocking layer or to the adhesive layer to be formed on the reverse surface thereof as required.

In the photocatalyst film of the present invention, an organic-inorganic composite graded film is formed as a protective layer (B) on one surface of the above substrate film. The organic-inorganic composite graded film is formed directly on the surface of the plastic film when the plastic film has no ultraviolet-blocking layer, and it is formed on the ultraviolet-blocking layer when the plastic film has the ultraviolet-blocking layer.

The organic-inorganic composite graded film has a components-gradient structure in which an organic polymer component is present on the substrate film side, a metal oxide compound component is present on the opposite side and the contents of these two components continuously change in the thickness direction.

The above composite graded film can be formed from a coating agent prepared by together hydrolyzing (a) an organic polymer compound whose molecule has a metal-containing group capable of bonding to a metal oxide by hydrolysis (to be sometimes referred to as "hydrolyzable metal-containing group" hereinafter) and (b) a metal-containing compound capable of forming a metal oxide by hydrolysis.

The above organic polymer compound having a hydrolyzable metal-containing group as component (a) can be obtained by copolymerizing (i) an ethylenically unsaturated monomer having a hydrolyzable metal-containing group and (ii) an ethylenically unsaturated monomer free of any metal.

The above ethylenically unsaturated monomer having a hydrolyzable metal-containing group as the above component (a)(i) includes groups of the general formula (I),

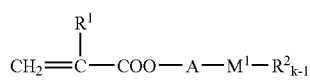
(I)

wherein $R^1$ is a hydrogen atom or methyl, A is an alkylene group, preferably an alkylene group having 1 to 4 carbon atoms, $R^2$ stands for hydrolyzable or non-hydrolyzable group (s), provided that at least one of them is required to be a hydrolyzable group that can be chemically bonded to the component (b) by hydrolysis and that when a plurality of $R^2$s are present, each $R^2$ may be the same as, or different from, other or every other, $M^1$ is a metal atom such as silicon, titanium, zirconium, indium, tin, aluminum, or the like, and k is a valence of the metal atom $M^1$.

In the above general formula (I), the hydrolyzable group that is represented by $R^2$ and can be chemically bonded to the component (b) by hydrolysis preferably includes, for example, an alkoxyl group, an isocyanate group, halogen atoms such as a chlorine atom, an oxyhalogen group, an acetyl acetonate group and a hydroxyl group, and the non-hydrolyzable group that does not chemically bond to the component (b) preferably includes, for example, a lower alkyl group.

Examples of the metal-containing group represented by $—M^1R^2_{k-1}$ in the general formula (I) include trimethoxysilyl, triethoxysilyl, tri-n-propoxysilyl, triisopropoxysilyl, tri-n-butoxysilyl, triisobutoxysilyl, tri-sec-butoxysilyl, tri-tert-butoxysilyl, trichlorosilyl, dimethylmethoxysilyl, methyldimethoxysilyl, dimethylchlorosilyl, methyldichlorosilyl, triisocyanatosilyl, methyldiisocyanatosilyl, etc., and they also include a trimethoxytitanium group, a triethoxytitanium group, a tri-n-propoxytitanium group, a triisopropxytitanium group, tri-n-butoxytitanium group, a triisobutyoxytitanium group, a tri-sec-butoxytitanium group, a tri-tert-butoxytitanium group and a trichlorotitanium group. They further include a trimethoxyzirconium group, a triethoxyzirconium group, a tri-n-propoxyzirconium group, a triisopropoxyzirconium group, a tri-n-butoxyzirconium group, a triisobutoxyzirconium group, a tri-sec-butoxyzirconium group, a tri-tert-butoxyzirconium group and a trichlorozirconium group, and they furthermore include a dimethoxyaluminum group, a diethoxyaluminum group, a di-n-propoxyaluminum group, a diisopropoxyaluminum group, a di-n-butoxyaluminum group, a diisobutoxyaluminum group, di-sec-butoxyaluminum group, a di-tert-butoxyaluminum group and a trichloroaluminum group.

The above ethylenically unsaturated monomers as component (i) may be used singly or may be used in combination of at least two members thereof.

The ethylenically unsaturated monomer free of any metal as the above component (ii) includes, for example, an ethylenically unsaturated monomer of the general formula (II),

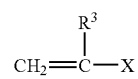
(II)

wherein $R^3$ is a hydrogen atom or methyl and X is a monovalent organic group, preferably, an ethylenically unsaturated monomer of the general formula (II-a)

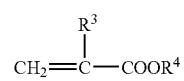
(II-a)

wherein $R^3$ is as defined above and $R^4$ is a hydrocarbon group, or a mixture of the ethylenically unsaturated monomer of the above general formula (II-a) with an ethylenically unsaturated monomer of the general formula (II-b) as an adhesion improving agent which is added as required,

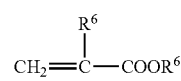
(II-b)

wherein $R^5$ is a hydrogen atom or methyl, $R^6$ is a hydrocarbon group having an epoxy group, a halogen atom or an ether bond.

In the ethylenically unsaturated monomer of the above general formula (II-a), the hydrocarbon group represented by $R^4$ includes a linear or branched alkyl group having 1 to 10 carbon atoms, a cycloalkyl group having 3 to 10 carbon atoms, an aryl group having 6 to 10 carbon atoms and an aralkyl group having 7 to 10 carbon atoms. Examples of the alkyl group having 1 to 10 carbon atoms include methyl, ethyl, n-propyl, isopropyl and various types of butyl, pentyl, hexyl, octyl and decyl. Examples of the cycloalkyl group having 3 to 10 carbon atoms include cyclopentyl, cyclohexyl, methylcyclohexyl and cyclooctyl, examples of the aryl group having 6 to 10 carbon atoms include phenyl, tolyl, xylyl, naphthyl and methylnaphthyl, and examples of the aralkyl group having 7 to 10 carbon atoms include benzyl, methylbenzyl, phenethyl and naphthylmethyl.

Examples of the ethylenically unsaturated monomer of the above general formula (II-a) include methyl (meth)acrylate, ethyl (meth)acrylate, propyl (meth)acrylate, butyl (meth)acrylate, hexyl (meth)acrylate, 2-ethylhexyl (meth)acrylate, cyclohexyl (meth)acrylate, phenyl (meth)acrylate and benzyl (meth)acrylate. These may be used singly or may be used in combination of at least two members thereof.

In the ethylenically unsaturated monomer of the above general formula (II-b), the hydrocarbon group having an epoxy group, a halogen atom or an ether bond, represented by $R^6$, preferably includes a linear or branched alkyl group having 1 to 10 carbon atoms, a cycloalkyl group having 3 to 10 carbon atoms, an aryl group having 6 to 10 carbon atoms and an aralkyl group having 7 to 10 carbon atoms. The halogen atom as the above substituent preferably includes a chlorine atom and a bromine atom. Specific examples of the above hydrocarbon group include those that are described as examples in the explanation of $R^4$ in the above general formula (II-a).

Examples of the ethylenically unsaturated monomer of the above general formula (II-b) preferably include glycidyl (meth)acrylate, 3-glycidoxypropyl (meth)acrylate, 2-(3,4-epoxycyclohexyl)ethyl (meth)acrylate, 2-chloroethyl (meth)acrylate and 2-bromoethyl (meth)acrylate.

In addition to these, as an ethylenically unsaturated monomer of the above general formula (II), there can be used styrene, α-methylstyrene, α-acetoxystyrene, m-, o- or p-bromostyrene, m-, o- or p-chlorostyrene, m-, o- or p-vinylphenol, 1- or 2-vinylnaphthalene, etc., and further, there can be also used a stabilizer having an ethylenically unsaturated group for a polymerizable polymer, such as an antioxidant, an ultraviolet absorbent or a light stabilizer having an ethylenically unsaturated group. These may be used singly or may be used in combination of at least two members thereof.

Further, when the ethylenically unsaturated monomer of the general formula (II-a) and the ethylenically unsaturated monomer of the general formula (II-b) are used in combination, preferably, the latter ethylenically unsaturated monomer is used in an amount of 1 to 100 mol % based on the former ethylenically unsaturated monomer.

The above ethylenically unsaturated monomer having a hydrolyzable metal-containing group as component (i) and the above ethylenically unsaturated monomer free of any metal as component (ii) are radical-copolymerized in the presence of a radical polymerization initiator, whereby the organic polymer compound having a hydrolyzable metal-containing group as component (a) can be obtained.

On the other hand, as the metal-containing compound capable of forming a metal oxide by hydrolysis (hydrolyzable metal-containing compound), as component (b), there is used a compound of the general formula (III), $$R^7_{m-n}M^2R^8_n \quad \text{(III)}$$

wherein $R^7$ is a non-hydrolyzable group, $R^8$ is a hydrolyzable group, $M^2$ is a metal atom, m is a valence of the metal atom $M^2$ and n is an integer that satisfies the relationship of $0<n\leq m$, or a condensation oligomer thereof.

In the above general formula (III), when a plurality of $R^7$s are present, each of the plurality of $R^7$s may be the same as, or different from, other or every other one, and when a plurality of $R^8$s are present, each of the plurality of $R^8$s may be the same as, or different from, other or every other one. Examples of the non-hydrolyzable group represented by $R^7$ preferably include an alkyl group, an aryl group and an alkenyl group, and examples of the hydrolyzable group represented by $R^8$ include a hydroxyl group, an alkoxyl group, an isocyanate group, halogen atoms such as a chlorine atom, etc., an oxyhalogen group and an acetylacetonate group. Examples of the metal atom represented by $M^2$ include silicon, titanium, zirconium, indium, tin and aluminum.

Examples of the compound of the above general formula (III) or the condensation oligomer thereof include tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, etc., and tetraalkoxytitanium and tetraalkoxyzirconium corresponding thereto. Further, they include metal alkoxides such as trimethoxyaluminum, triethoxyaluminum, tri-n-propoxyaluminum, triisopropoxyaluminum, tri-n-butoxyaluminum, triisobutoxyaluminum, tri-sec-butoxyaluminum, tri-tert-butoxyaluminum, or metal alkoxide oligomers such as "Methyl Silicate 51" and "Ethyl Silicate 40" (these are all trade names of Colcoat Co., Ltd.) and "MS-51" and "MS-56" (these are all trade names of Mitsubishi Chemical Corporation) which are commercially available alkoxysilane oligomers, and they further include tetraisocyanatosilane, methyltriisocyanatosilane, tetrachlorosilane and methyltrichlorosilane. Alkoxides of metals are preferred as component (B).

In the present invention, these hydrolyzable metal-containing compounds may be used singly or may be used in combination of at least two members thereof. However, of the above compounds, tetraalkoxytitanium whose alkoxyl group has 1 to 5 carbon atoms is preferred.

In the present invention, a mixture of the above organic polymer compound as component (a) and at least one hydrolyzable metal-containing compound as component (b) is hydrolyzed in a proper polar solvent such as an alcohol, a ketone or an ether in the presence of an acid such as hydrochloric acid, sulfuric acid, nitric acid, or the like or a cation exchange resin as a solid acid, at a temperature, generally, of 0 to 100° C., preferably 20 to 60° C. When the solid acid is used, it is removed, and further, the solvent is distilled off, or a solvent is added, as required, to adjust the hydrolysis product to a viscosity suitable for application, whereby a coating agent formed of the coating liquid is prepared. When the above temperature is too low, the hydrolysis does not proceed. When it is too high, the reaction for the hydrolysis and polymerization proceeds too fast, and the reaction is difficult to control. As a result, the gradient of the thus-obtained graded coating film may decrease. Alternatively, there may be employed a constitution in which an acid is added to a solution containing the component (b) to cause the component (b) to undergo hydrolysis and condensation, and a solution containing the component (b) is added thereto to prepare a coating agent.

After the coating liquid is prepared, some inorganic components sometimes gradually proceed with hydrolysis and polycondensation to change application conditions, so that a solid dehydrating agent insoluble in the coating liquid, such as anhydrous magnesium sulfate, or the like is added, which can prevent the pot life thereof from decreasing. In this case, the coating liquid is used for application after the above dehydrating agent is removed.

Then, the coating agent of the thus-obtained coating liquid is applied directly to a substrate surface or the ultraviolet-blocking layer formed on the substrate film surface such that a dry coating film having an average thickness in the range of 40 to 300 nm, preferably 30 to 200 nm is formed, by known means such as a dip coating method, a spin coating method, a spray coating method, a bar coating method, a knife coating method, a roll coating method, a blade coating method, a die coating method or a gravure coating method, to form a coating film, and the coating film is dried by known drying, for example, under heat at a temperature of approximately 40 to 150° C., whereby a desired organic-inorganic composite graded film is formed.

When the average thickness of the above composite graded film is less than 40 nm, the composite graded film does not fully exhibit the function as the protective layer, and it is difficult to obtain the high-durability photocatalyst film. When it exceeds 300 nm, a cracking, etc., may take place due to bending or flexing.

The above organic-inorganic graded film can be formed, for example, by applying the above coating agent such that a formed film has an amount, as component (a), 0.5 to 5.0 g/100 m$^2$, preferably 0.5 to 3.0 g/100 m$^2$.

In the thus-formed organic-inorganic composite graded film, the content of metal component of the composite film in the surface layer thereof is almost 100%, and the above content gradually decreases toward the substrate and comes to be almost 0% in the vicinity of the substrate. That is, substantially, that portion of the above organic-inorganic composite graded film which is on the side of the organic substrate is formed of an organic polymer compound component alone, and the opposite portion is formed of a metal oxide compound component alone.

The above gradient structure can be confirmed, for example, by sputtering the graded film surface to scrape part off, and measuring contents of carbon atoms and metal atoms on the film surface with the passage of time by X ray photoelectron spectroscopy, or the like.

The content of the metal component in the above composite graded film is not specially limited, while the content thereof as a metal oxide is generally 5 to 98% by weight, preferably 20 to 98%, particularly preferably in the range of 50 to 90% by weight. The polymerization degree and molecular weight of the organic polymer compound are not specially limited so long as the compound is formable into a film, and they can be determined as required depending upon kinds and desired graded film properties of the polymer compound.

In the photocatalyst film of the present invention, a photocatalytically active material layer is formed on the thus-formed organic-inorganic composite graded film. The photocatalytically active material for use in the photocatalytically active material layer is not specially limited, and it includes known materials such as titanium dioxide, strontium titanate ($SrTiO_3$), barium titanate ($BaTi_4O_9$), sodium titanate ($Na_2Ti_6O_{13}$), zirconium dioxide, $\alpha$-$Fe_2O_3$, tungsten oxide, $K_4Nb_6O_{17}$, $Rb_4Nb_6O_{17}$, $K_2Rb_2Nb_6O_{17}$, cadmium sulfide, zinc sulfide, and the like. These may be used singly or may be used in combination of at least two members thereof. Of these, titanium dioxide, particularly anatase type titanium dioxide is useful as a practical photocatalytically active material. This titanium dioxide absorbs light having a specific wavelength contained in ordinary light such as sunlight and thereby exhibits excellent photocatalyst activities.

The photocatalytically active material layer in the present invention may contain a known photocatalysis promoter together with the above photocatalytically active material as required for promoting the photocatalytic activities. Examples of the photocatalysis promoter preferably include platinum group metals such as platinum, palladium, rhodium, ruthenium, and the like. These may be used singly or may be used in combination of at least two members thereof. The amount of the photocatalysis promoter is generally in the range of 1 to 20% by weight based on the total weight of the photocatalytically active material and the photocatalysis promoter in view of photocatalytic activities.

The method of forming the photocatalytically active material layer on the organic-inorganic composite graded film is not specially limited, and various methods can be employed. Examples thereof preferably include PVD methods (physical gaseous phase vapor deposition method) such as a vacuum vapor deposition method and a sputtering method, a dry method such as a metal flame spray coating method, and a wet method using a coating liquid.

As a dry method, a metal flame spray coating method is particularly preferred in that an apparatus and operation therefor are simple. The metal flame spray coating method is a method in which the photocatalytically active material is melted with a gas combustion flame and sprayed onto the composite graded film in the form of fine particles, to form the photocatalytically active material layer. In this method, when the photocatalysis promoter is used together with the photocatalytically active material, a mixture of the photocatalytically active material and the photocatalysis promoter may be melted and sprayed onto the composite graded film. Alternatively, a melt of the photocatalytically active material may be first sprayed onto the composite graded film, and then a melt of the photocatalysis promoter may be sprayed thereon.

In the method using a coating liquid, there may be employed a method in which a coating liquid that is a dispersion of the photocatalytically active material and fine particles of the optional photocatalysis promoter and an optional inorganic binder in a proper solvent is prepared, the coating liquid is applied onto the composite graded film by a known method such as a dip coating method, a spin coating method, a spray coating method, a bar coating method, a knife coating method, a roll coating method, a bladed coating method, a die coating method or a gravure coating method, and the applied coating liquid is dried naturally or under heat, to form the photocatalytically active material layer. Further, when the photocatalysis promoter is used, for example, a coating liquid containing the photocatalytically active material and fine particles of the optional inorganic binder, etc., is applied onto the composite graded film to form a coating film of the photocatalytically active material, and then a photocatalysis promoter layer is formed on the coating film of the photocatalytically active material by a photo-deposition method in which a substrate film having the above composite graded film on which the coating film of the photocatalytically active material is formed is immersed in an aqueous solution from which dissolved oxygen is removed and which contains metal ion of the photocatalysis promoter and the metal ion is deposited on the coating film surface by irradiation with light, whereby the photocatalytically active material layer can be formed as well.

The inorganic binder for optional use in the preparation of the above coating liquid can be any binder and is not specially limited so long as it can exhibit a function as a binder. Examples thereof include oxides and hydroxides of metals such as silicon, aluminum, titanium, zirconium, magnesium, niobium, tungsten, tin, tantalum, etc., or composite oxides and composite hydroxides of at least two metals selected from the above metals. These inorganic binders may be used singly or may be used in combination of at least two members thereof. Further, the above coating liquid may contain conventionally known other additives for use in a coating liquid for a photocatalytically active material layer, such as a silicone resin, a modified silicone resin and a silane coupling agent.

In the photocatalyst film of the present invention, the thickness of the photocatalytically active material layer is generally determined to be in the range of 10 nm to 5 μm. When this thickness is less than 10 μm, the photocatalytic function is not fully exhibited. When it exceeds 5 μm, there is observed no further effect on improvement of photocatalytic functions for such a large thickness, and it may rather cause a cracking or decrease the flexibility thereof. The thickness is preferably 20 nm to 2 μm, particularly preferably in the range of 20 nm to 1 μm.

In the photocatalyst film of the present invention, the photocatalytically active material layer is formed on the substrate film via the organic-inorganic composite graded film, and substantially, the composite graded film is formed of a metal oxide compound component alone in an interface to the photocatalytically active material layer and is formed of an organic polymer compound component alone in a surface in contact with the substrate film, so that the adhesion between the substrate and the composite graded film and the adhesion between the photocatalytically active material layer and the composite graded film are remarkably excellent. In the interface to the photocatalytically active material layer, further, the composite graded film is substantially formed of the metal oxide compound component alone, so that the deterioration caused on the composite graded film by the photocatalytic function of the photocatalytically active material layer can be suppressed.

Further, the photocatalyst film of the present invention uses, as a substrate, the plastic film excellent in weather resistance and solvent resistance, so that the photocatalyst film has excellent durability against activated energy rays such as ultraviolet light employed for exciting the photocatalytically active material layer, and since the plastic film has excellent durability against a solvent used for forming the composite graded film, the photocatalyst film is excellent in durability.

After a 3,000 hours' accelerated weather resistance test with a carbon arc type sunshine weatherometer, the photocatalyst film has a total light transmittance of 85% or more, a haze of 5% or less, a yellow index (YI) of 10 or less and a water contact angle of 10° or less, so that the photocatalyst film has high durability.

The conditions of the above accelerated weather resistance test and the measurement methods for the total light transmittance, the haze and the yellow index (YI) are as explained with regard to the above substrate film. Further, the water contact angle refers to a value obtained by measuring a photocatalytically active material layer with a contact angle measuring device under conditions of a temperature of 25° C. and 50% RH.

In the photocatalyst film of the present invention, an adhesive layer (D) can be provided to that surface of the substrate film which is opposed to the photocatalytically active material layer. In this manner, the photocatalyst film of the present invention can be easily bonded to an object article.

The adhesive for constituting the above adhesive layer can be selected from known various adhesives as required depending upon circumstances, while acrylic, urethane-based and silicone-based adhesives are particularly preferred in view of weather resistance, and the like. The thickness of the adhesive layer is generally 5 to 100 μm, preferably in the range of 10 to 60 μm. The adhesive layer may contain an anti-weathering agent such as the above ultraviolet absorbent or light stabilizer as required.

In the photocatalyst film of the present invention, further, a peel film may be provided on the above adhesive layer. Examples of the peel film include papers such as glassine paper, coated paper and laminated paper and various plastic films coated with a peel agent such as a silicone resin. While the thickness of the peel film is not specially limited, it is generally approximately 20 to 150 μm. When the peel film is provided, the peel film is peeled off, and the photocatalyst film can be attached in a manner in which the adhesive layer surface comes in contact with an object article when the photocatalyst film is used.

In the photocatalyst film of the present invention, further, a protective film may be formed on the surface of the photocatalytically active material layer (C). Generally, the protective film is removed when the photocatalyst film is used.

FIG. 1 is a cross-sectional view showing one embodiment of constitution of the photocatalyst film of the present invention. The photocatalyst film 10 has a structure in which a substrate film 1 has a plastic film 1$a$ and an ultraviolet-blocking layer 1$b$ formed on the surface of the plastic film 1$a$, a photocatalytically active material layer 3 is formed on the substrate film 1 via an organic-inorganic composite graded film 2, and a peel film 5 is formed on the opposite surface of the substrate film 1 via an adhesive layer 4.

The ultraviolet-blocking layer 1$b$ is not necessarily required when the plastic film 1$a$ has full durability. The ultraviolet-blocking layer may be formed between the adhesive layer 4 and the plastic film 1$a$ as required. A protective layer may be formed on the photocatalytically active material layer 3.

The above high-durability photocatalyst film of the present invention is transparent and has antifouling, antibacterial and deodorization functions, and the like. For example, the photocatalyst film is attached to a body and a window glass of an automobile or various transport means, to an architectural structure or a window glass thereof, to a street indicator, a roadside signboard, a sound insulating wall on an express way or a curved mirror, or to an inside of a freezing or refrigeration show case or a green house, whereby it produces effects that it prevents the fouling of an object article to which it is attached, that it decomposes a trace amount of harmful substances in an internal space and that it prevents scattering of glass when the glass is broken.

Further, the photocatalyst film can be used as a food packaging wrapping film, a film to be attached to an inner surface of a plastic container to keep drinking water or a film for others.

According to the present invention, further, there is also provided a structure having a photocatalytic function on a surface formed of the above high-durability photocatalyst film.

The present invention will be explained further in detail with reference to Examples hereinafter, while the present invention shall not be limited by these Examples.

Properties of substrate films, the gradient of protective layers and the performance of photocatalyst films were evaluated according to the following methods.

(1) Properties of Substrate Film (a) Accelerated Weather Resistance Test

An accelerated weather resistance test was carried out by a carbon arc type sunshine weatherometer testing method [testing machine: sunshine weatherometer "S300" supplied by Suga Test Instruments Co., Ltd.] according to JIS K7350, and measurements were made for a total light transmittance, a haze and a yellow index (YI). The conditions of the accelerated weather resistance test in Examples 1 and 2 and Comparative Examples 1 to 3 include an irradiance level: 225 W/m², cycle: one cycle of 2 hours including irradiation for 102 minutes and irradiation+rain for 18 minutes, totaling 3,000 hours, a black panel temperature: 63±3° C., and a relative humidity: 55±5%. The conditions of the accelerated weather resistance test in Example 3 include an irradiance level: 255 W/m², cycle: one cycle of 2 hours including irradiation for 102 minutes and irradiation+rain for 18 minutes, totaling 1,000 hours, a black panel temperature: 63±3° C., and a relative humidity: 50±2%.

The methods for measuring a total light transmittance, a haze and a yellow index (YI) are as follows.

Total light transmittance, haze

Measured with a haze meter "NDH2000" supplied by Nippon Denshoku Kogyo K.K. according to JIS K7361.

Yellow index (YI)

Measured with an ultraviolet-visible light spectrophotometer supplied by Shimadzu Corporation according to JIS K7103.

(b) Solvent Resistance Test

A substrate film surface was wetted with methyl isobutyl ketone and left for 20 seconds, and after the liquid was driven away by spin coating (1,500 rpm, 20 seconds), a change in haze was determined. The hazes were measured by the same method as that described above.

(2) Gradient of Protective Layer

The surface of a film was scraped off by argon sputtering (4 kV) with an XPS apparatus "PHI-5600" (supplied by ULVAC-PHI, Inc.) at intervals of 3 minutes, and measurements were made for contents of carbon atoms and metal atoms in the film surface X ray photoelectron spectroscopy, to evaluate the film for a gradient.

(3) Performances of Photocatalyst Film (a) Accelerated Weather Resistance Test

An accelerated weather resistance test was carried out in the same manner as in the above (1)(a), and a photocatalyst film was measured for a total light transmittance, a haze, a yellow index (YI) and a water contact angle.

Total light transmittance, haze

Measured in the same manner as in the measurement of a substrate film in the above (1).

Yellow index (YI)

Measured in the same manner as in the measurement of a substrate film in the above (1).

Water contact angle

A photocatalytically active material layer was measured with a contact angle measuring apparatus "G-1-100" supplied by ERMA Inc. under conditions of a temperature of 25° C. and an RH of 50%.

PREPARATION EXAMPLE 1

Preparation of Composite Graded Film Coating Liquid

A 1.2-liter separable flask was charged with 460 g of methyl isobutyl ketone (MIBK), 190 g of methyl methacrylate, 24 g of γ-methacryloxypropyltrimethoxysilane and 1.4 g of azobisisobutyronitrile and sealed with nitrogen, and the mixture was allowed to undergo polymerization at 60° C. for 20 hours. From the thus-obtained solution, 69.0 g thereof was weighed and separated and the separated solution was diluted with 4,910 g of MIBK, to obtain an organic component solution (a).

To a solution of 472 g of titanium tetraisopropoxide and 931 g of ethyl cellosolve in a 2.5-liter separable flask was gradually dropwise added a mixture solution of 78.7 g of concentrated nitric acid, 28.4 g of water and 364 g of ethyl cellosolve with stirring, and then, the mixture was stirred at 30° C. for 4 hours. From the obtained solution, 1,683 g thereof was weighed and separated, and the separated solution was diluted with 3,317 g of ethyl cellosolve to give an inorganic component solution (b). Finally, 2,440 g of the organic component solution (a) and 2,860 g of the inorganic component solution (b) were mixed, to give a composite graded film coating liquid.

EXAMPLE 1

(1) Preparation and Evaluation of Substrate Film

100 Gram equivalents of an ultraviolet absorbent primer ("U Double UV-G300", supplied by Nippon Shokubai Kagaku Co., Ltd.) and 15 gram equivalents of an isocyanate curing agent (SUMIDUR N-3200, supplied by Sumitomo-Bayer Urethane Co., Ltd.) were mixed, and the mixture was applied to one surface of a 50 μm thick polyethylene terephthalate (PET) film ("LUMIRROR T-60" supplied by Toray Industries, Inc.) in a coating thickness of 5 μm, to give a PET film coated with a weather-resistant layer. After subjected to the 3,000 hours' accelerated weather resistance test using an irradiance level of 225 W/m² with the sunshine weatherometer (to be abbreviated as "SWM" hereinafter), this film had a total light transmittance of 87%, a haze of 2.3%, a yellow index (YI) of 7 and showed a haze change of 0.1% in the solvent resistant rest. Table 1 shows the evaluation results.

(2) Preparation of Photocatalyst Film

Figure 2:
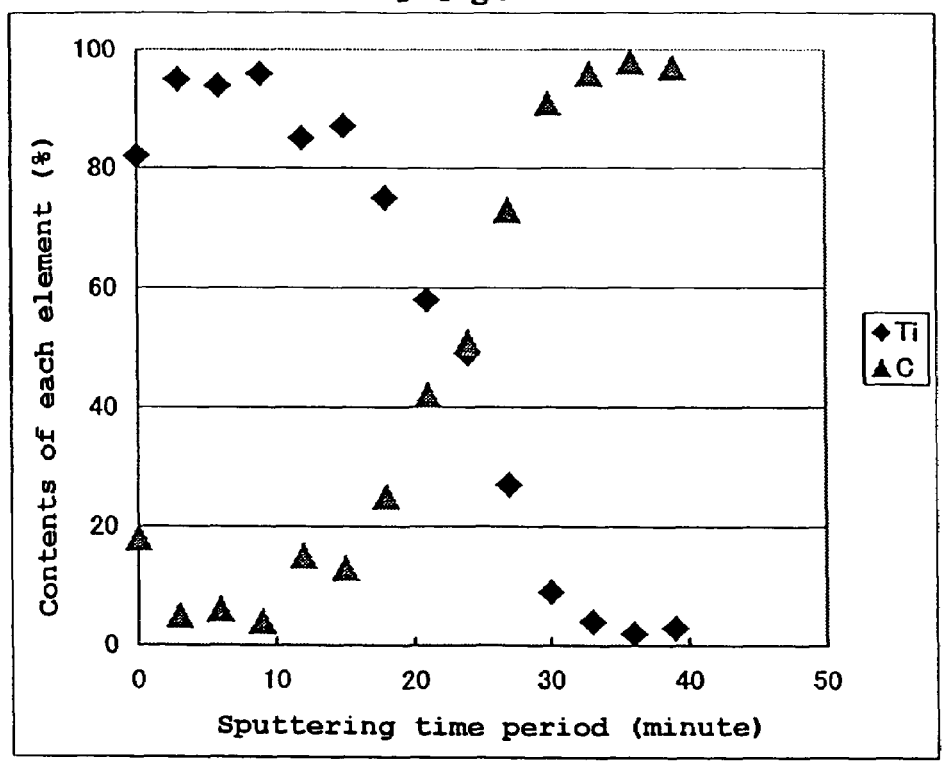
FIG. 2 is a graph showing a relationship of the sputtering time period to the contents of carbon atoms and titanium atoms in a protective layer of a photocatalyst film obtained in Example 1.

A film having a dry thickness of 70 nm was formed as a protective layer on the weather-resistant layer of the PET film coated with the weather-resistant layer obtained in the above (1) from the composite graded film coating liquid obtained in Preparation Example 1 with a Mayer bar. The composite graded film was measured for gradients of components with XPS, to show a profile shown in FIG. 2, so that the formation of a composite graded film was confirmed.

Then, a photocatalyst liquid ("ST-K211", supplied by Ishihara Sangyo Kaisha Ltd.) was applied onto the above composite graded film, to form a photocatalyst layer having a thickness of 40 nm. Further, a 30 μm thick protective film (SANTECT PAC2-70, supplied by Sun A Kaken Co.) was cold-laminated on the photocatalyst layer, and then a peel film with an adhesive, which had been obtained beforehand by applying an adhesive (a mixture of 100 parts by weight of "BPS-5296" supplied by Toyo Ink Manufacturing Co., Ltd. with 30 parts by weight of a curing agent "BXX-4773") to a 38 μm thick PET peel film, was laminated on that surface of the PET film which was opposed to the photocatalyst layer, to give a photocatalyst film.

(3) Weather Resistance Test of Photocatalyst Film

With regard to the photocatalyst film prepared in the above (2), a test piece was prepared by the following procedure.

The photocatalyst film from which the peel film was removed was placed on a 2 mm thick slide glass having side lengths of 50 mm such that the adhesive layer was in contact with it, and pressed with a rubber roller to stick the photocatalyst film thereto. Then, the protective film was peeled off and used as a sample for evaluation.

After subjected to the 3,000 hours' accelerated weather resistance test using an irradiance level of 225 W/m² with SWM, this photocatalyst film had a total light transmittance of 87%, a haze of 4.5%, a yellow index (YI) of 6 and a water contact angle of 5°. Table 1 shows the evaluation results.

EXAMPLE 2

Example 1 was repeated except that a 50 μm thick acrylic resin film ("Sun Duren 009NAT", supplied by Kanegafuchi Chemical Ind. Co., Ltd.) was used as a substrate film. Table 1 shows the evaluation results.

Figure 3:
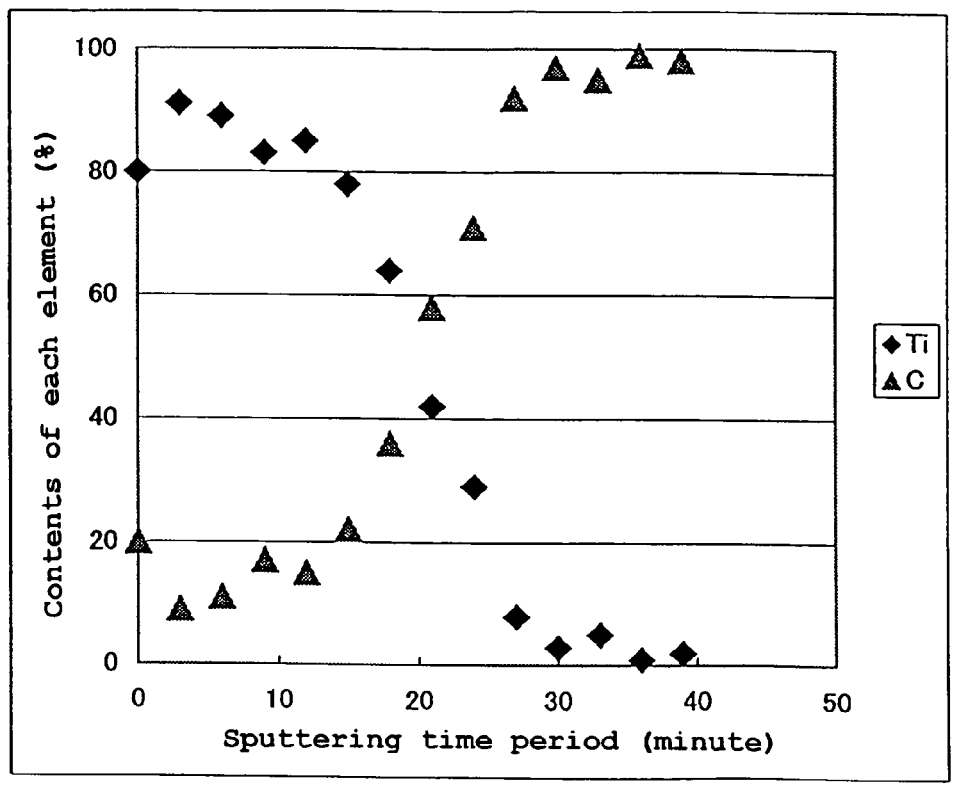
FIG. 3 is a graph showing a relationship of the sputtering time period to the contents of carbon atoms and titanium atoms in a protective layer of a photocatalyst film obtained in Example 2.

Further, FIG. 3 shows the XPS measurement result of a protective layer. It was thereby confirmed that the protective layer had a gradient of components.

Comparative Example 1

Example 1 was repeated except that a 50 μm thick PET film ("PET film T-60", supplied by Toray Industries, Inc.) was used as a substrate film. Table 1 shows the evaluation results.

Figure 4:
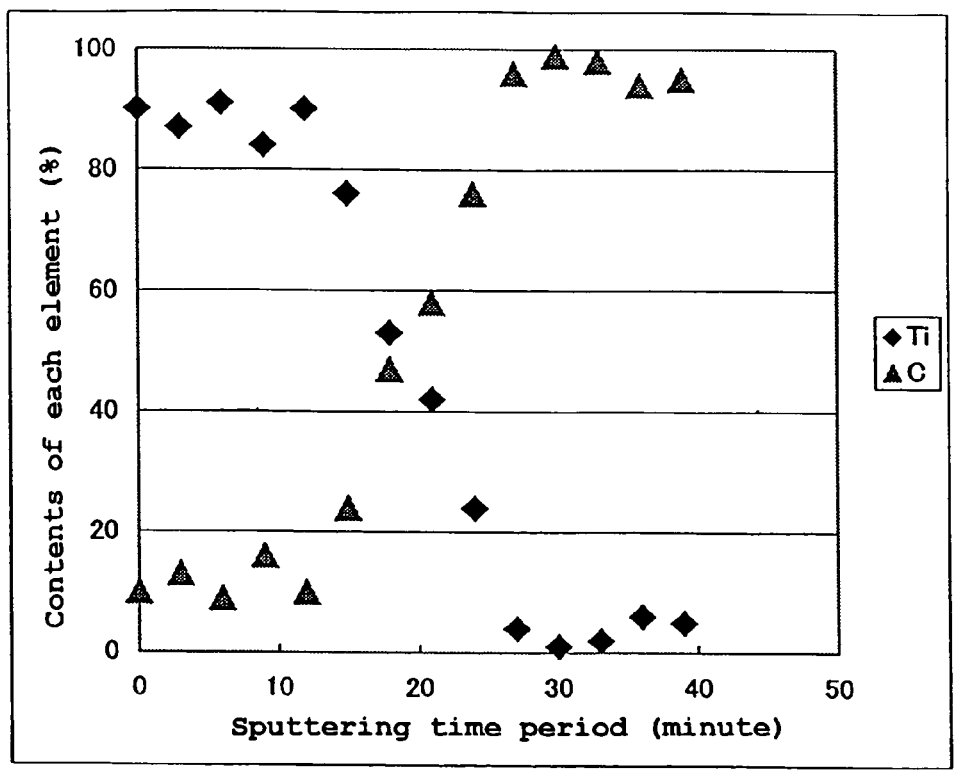
FIG. 4 is a graph showing a relationship of the sputtering time period to the contents of carbon atoms and titanium atoms in a protective layer of a photocatalyst film obtained in Comparative Example 1.

FIG. 4 shows the XPS measurement result of a protective layer. It was thereby confirmed that the protective layer had a gradient of components. However, the substrate film itself was poor in weather resistance, so that the photocatalyst film was very poor in durability.

Comparative Example 2

Example 1 was repeated except that the amount of the isocyanate curing agent "Sumidur N-3200" was changed to 5 gram equivalents when the weather-resistant layer was formed in the production of the substrate film in Example 1. Table 1 shows the evaluation results.

Figure 5:
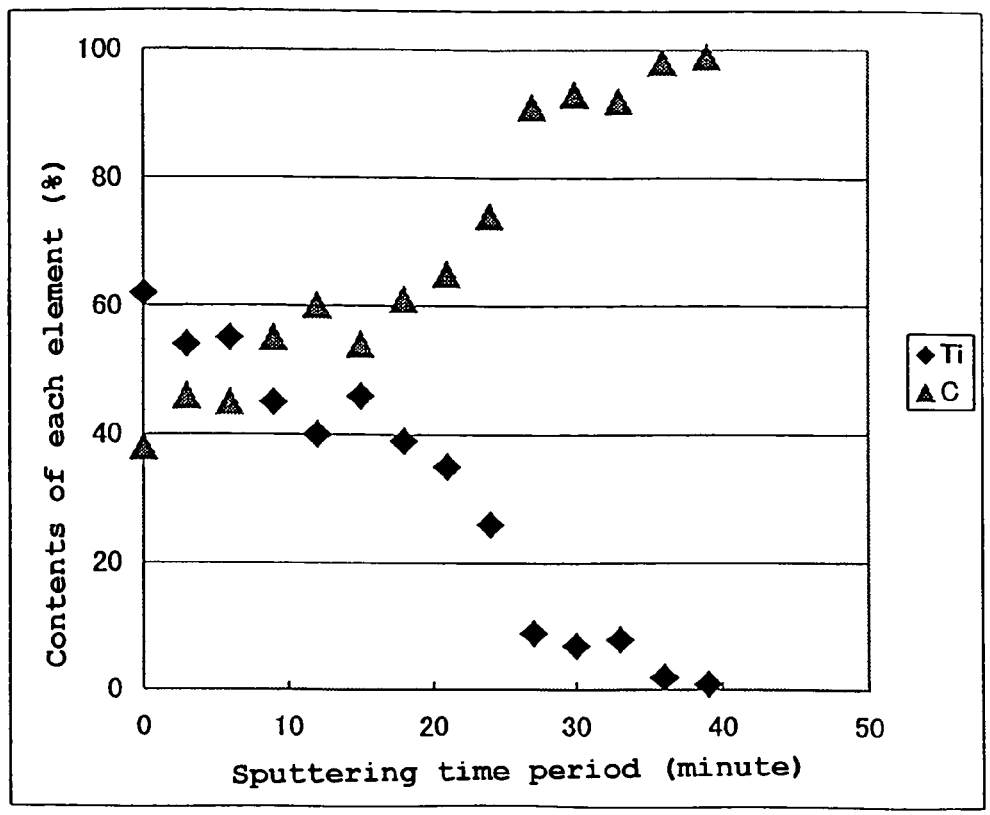
FIG. 5 is a graph showing a relationship of the sputtering time period to the contents of carbon atoms and titanium atoms in a protective layer of a photocatalyst film obtained in Comparative Example 2.

Further, FIG. 5 shows the XPS measurement result of a protective layer. From this Figure, a large amount of an organic polymer compound was present in that surface of the protective layer which was on the photocatalyst layer side, and no component-gradient structure was confirmed.

In this Comparative Example, the haze of the substrate greatly increased in the solvent resistance test, and the photocatalyst film was also very poor in durability. Comparative Example 3

Example 1 was repeated except that a 1 μm thick layer of an acryl silicone resin "BISTRATOR NRC-300A" supplied by Nippon Soda Co., Ltd. was formed as a protective layer. Table 1 shows the evaluation results.

Having had no composite graded film as a protective layer, the obtained photocatalyst film was very poor in durability.

TABLE 1

| | | | Example | | Comparative Example | | |
|---|---|---|---|---|---|---|---|
| | | | 1 | 2 | 1 | 2 | 3 |
| Substrate film | After 3000 hours in SWM | TT (%) | 87 | 88 | 72 | 86 | 86 |
| | | HZ (%) | 2.3 | 2.0 | 75 | 3.1 | 2.3 |
| | | YI | 7 | 6 | 25 | 7 | 7 |
| Solvent resistance of substrate [ΔHz] (%) | | | 0.1 | 0.5 | 0 | 3 | 0.1 |
| Gradient of protective layer | | | graded | graded | graded | Not graded | — |
| Photocatalyst film | After 3000 hours in SWM | TT (%) | 87 | 87 | 70 | 55 | 75 |
| | | HZ (%) | 4.5 | 4.3 | 80 | 72 | 32 |
| | | YI | 6 | 5 | 25 | 11 | 7 |
| | | Water contact angle (degree) | 5 | 6 | 10 | 35 | 60 |

(Notes)
TT: Total light transmittance,
HZ: Haze,
YI: Yellow index,

TABLE 1-continued

| Example | | Comparative Example | | |
|---|---|---|---|---|
| 1 | 2 | 1 | 2 | 3 |

SWM: sunshine weatherometer

EXAMPLE 3

(1) Preparation and Evaluation of Substrate Film

100 Gram equivalents of an ultraviolet absorbent primer ("U Double UV-G300", supplied by Nippon Shokubai Kagaku Co., Ltd.) and 15 gram equivalents of an isocyanate curing agent (Sumidur N-3200, supplied by Sumitomo-Bayer Urethane Co., Ltd.) were mixed, and the mixture was applied to one surface of a 50 μm thick polyethylene terephthalate (PET) film ("LUMIRROR T-60" supplied by Toray Industries, Inc.) in a coating thickness of 5 μm, to give a PET film coated with a weather-resistant layer. After subjected to the 1,000 hours' accelerated weather resistance test using an irradiance level of 255 W/m² with the sunshine weatherometer (to be abbreviated as "SWM" hereinafter), this film had a total light transmittance of 88%, a haze of 2.0%, a yellow degree index (YI) of 5.5 and showed a haze change of 0.1% in the solvent resistant rest. Table 2 shows the evaluation results.

(2) Preparation of Photocatalyst Film

Figure 6:
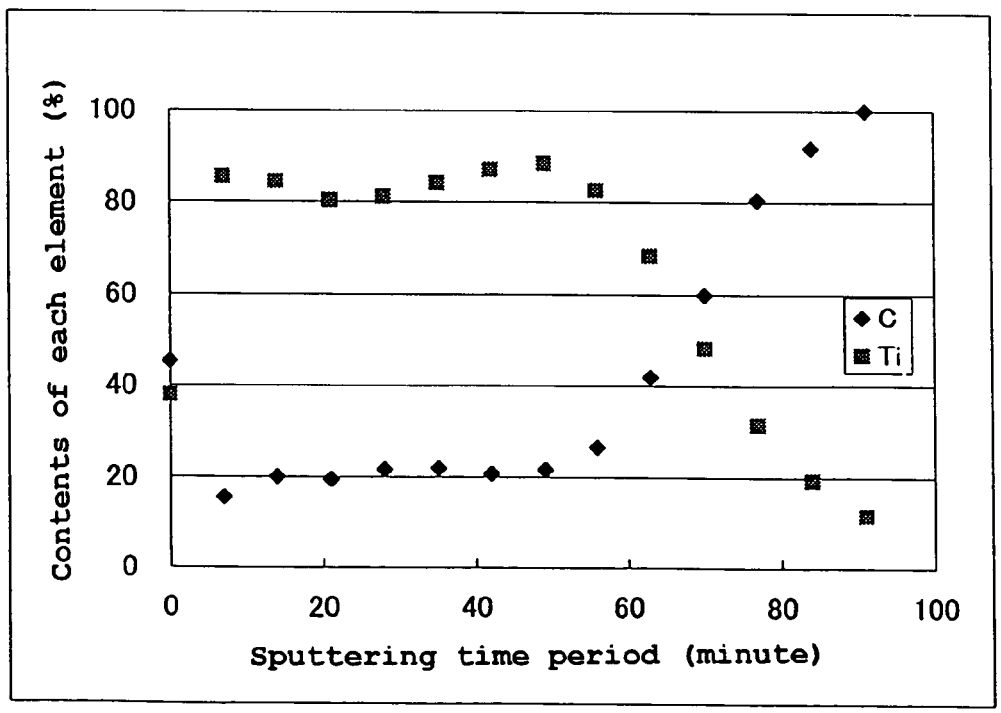
FIG. 6 is a graph showing a relationship of the sputtering time period to the contents of carbon atoms and titanium atoms in a protective layer of a photocatalyst film obtained in Example 3.

A film having a dry thickness of 170 nm was formed as a protective layer on the weather-resistant layer of the PET film coated with the weather-resistant layer obtained in the above (1) from the composite graded film coating liquid obtained in Preparation Example 1 with a Mayer bar. The composite graded film was measured for gradients of components with XPS, to show a profile shown in FIG. 6, so that the formation of a composite graded film was confirmed.

Then, a photocatalyst liquid ("PC-455", supplied by Titan Kogyo K.K.) was applied onto the above composite graded film, to form a photocatalyst layer having a thickness of 40 nm. Further, a 30 μm thick protective film (SANTECT PAC2-70, supplied by SUN A KAKEN Co.) was cold-laminated on the photocatalyst layer, and then a peel film with an adhesive, which had been obtained beforehand by applying an adhesive (a mixture of 100 parts by weight of "BPS-5296" supplied by Toyo Ink Manufacturing Co., Ltd. with 30 parts by weight of a curing agent "BXX-4773") to a 38 μm thick PET peel film, was laminated on that surface of the PET film which was opposed to the photocatalyst layer, to give a photocatalyst film.

(3) Weather Resistance Test of Photocatalyst Film

With regard to the photocatalyst film prepared in the above (2), a test piece was prepared by the following procedure.

The photocatalyst film from which the peel film was removed was placed on a 2 mm thick slide glass having side lengths of 50 mm such that the adhesive layer was in contact with it, and pressed with a rubber roller to stick the photocatalyst film thereto. Then, the protective film was peeled off and used as a sample for evaluation.

After subjected to the 1,000 hours' accelerated weather resistance test using an irradiance level of 255 W/m² with SWM, this photocatalyst film had a total light transmittance of 87%, a haze of 2.7%, a yellow index (YI) of 6 and a water contact angle of 5°. Table 2 shows the evaluation results.

TABLE 2

|  |  |  | Example 3 |
|---|---|---|---|
| Substrate film | After 1000 hours in SWM | TT (%) | 88 |
|  |  | HZ (%) | 2.0 |
|  |  | YI | 5.5 |
| Solvent resistance of substrate [ΔHZ] (%) |  |  | 0.1 |
| Gradient of protective layer |  |  | graded |
| Photocatalyst film | After 1000 hours in SWM | TT (%) | 87 |
|  |  | HZ (%) | 2.7 |
|  |  | YI | 6 |
|  |  | Water contact angle (degree) | 5 |

(Notes)
TT: Total light transmittance,
HZ: Haze,
YI: Yellow index,
SWM: sunshine weatherometer

INDUSTRIAL UTILITY

According to the present invention, there can be provided a photocatalyst film that has a photocatalytically active material layer on a substrate film surface via a protective layer, that is excellent in weather resistance, transparency and interlayer adhesion, that is useful as a functional film which exhibits photocatalytic functions and that particularly has a long life time, and a structure having photocatalytic functions on its surface on which the above photocatalyst film is formed.

The invention claimed is:

1. A high-durability photocatalyst film which is a laminated film having (A) an acrylic resin film or a polyethylene terephthalate film which is surface-coated with a crosslinking acrylic resin containing an anti-weathering agent as a substrate film, (B) a protective layer formed on one surface thereof and (C) a photocatalytically active material layer formed thereon and having photocatalytic functions, which uses, as said substrate film (A), a film (1) having a total light transmittance of 85% or more, a haze of 5% or less and a yellow index (YI) of 10 or less after a 3,000 hours' accelerated weather resistance test of the film having a thickness of 50 μm with a carbon arc type sunshine weatherometer (irradiance level 225 W/m$^2$) and (2) having a haze change of 1% or less after the film surface is wetted with methyl isobutyl ketone, is left for 20 seconds and then has a liquid driven away by spin coating (1,500 rpm, 20 seconds), and which uses, as said protective layer (B), an organic-inorganic composite graded film having an organic polymer component on the substrate film side and a metal oxide compound component on the opposite side and having contents of the two components which contents continuously change in the thickness direction, said laminated film having a total light transmittance of 85% or more, a haze of 5% or less, a yellow index (YI) of 10 or less and a water contact angle of 10° or less after a 3,000 hours' accelerated weather resistance test with a carbon arc type sunshine weatherometer (irradiance level 225 W/m$^2$).

2. A high-durability photocatalyst film which is a laminated film having (A) an acrylic resin film or a polyethylene terephthalate film which is surface-coated with a crosslinking acrylic resin containing an anti-weathering agent as a substrate film, (B) a protective layer formed on one surface thereof and (C) a photocatalytically active material layer formed thereon and having photocatalytic functions, which uses, as said substrate film (A), a film (1) having a total light transmittance of 85% or more, a haze of 5% or less and a yellow index (YI) of 10 or less after a 1,000 hours' accelerated weather resistance test of the film having a thickness of 50 μm with a carbon arc type sunshine weatherometer (irradiance level 255 W/m$^2$) and (2) having a haze change of 1% or less after the film surface is wetted with methyl isobutyl ketone, is left for 20 seconds and then has a liquid driven away by spin coating (1,500 rpm, 20 seconds), and which uses, as said protective layer (B), an organic-inorganic composite graded film having an organic polymer component on the substrate film side and a metal oxide compound component on the opposite side and having contents of the two components which contents continuously change in the thickness direction, said laminated film having a total light transmittance of 85% or more, a haze of 5% or less, a yellow index (YI) of 10 or less and a water contact angle of 10° or less after a 1,000 hours' accelerated weather resistance test with a carbon arc type sunshine weatherometer (irradiance level 255 W/m$^2$).

3. The high-durability photocatalyst film of claim 1 or 2, which has an adhesive layer (D) on that surface of the substrate film which is opposed to the photocatalytically active material layer side.

4. The high-durability photocatalyst film of claim 3, which has a peel film on the surface of the adhesive layer (D).

5. The high-durability photocatalyst film of claim 1 or 2, which has a protective film on the surface of the photocatalytically active material layer (C).

6. The high-durability photocatalyst film of claim 1 or 2, wherein the organic-inorganic composite graded film as the protective layer (C) is a product formed by applying a coating agent prepared by together hydrolyzing (a) an organic polymer compound whose molecule contains a metal-containing group capable of bonding to a metal oxide by hydrolysis and (b) a metal-containing compound capable of forming a metal oxide by hydrolysis, such that the formed product has an amount, as a component (a), of 0.5 to 5.0 g/100 m$^2$.

7. The high-durability photocatalyst film of claim 6, wherein the metal-containing compound capable of forming a metal oxide by hydrolysis, as component (b), is tetraalkoxytitanium whose alkoxyl group has 1 to 5 carbon atoms.

8. A structure produced by forming the high-durability photocatalyst film recited in claim 1 or 2 and a photocatalytic function on a surface.

* * * * *